United States Patent

Smithers

[15] 3,643,033

[45] Feb. 15, 1972

[54] AUTOMATIC PRIVATE BRANCH EXCHANGE WITH PROVISION FOR OPERATOR ASSISTANCE

[72] Inventor: Ronald Smithers, Coventry, England

[73] Assignee: The General Electric Company Limited, London, England

[22] Filed: Jan. 11, 1968

[21] Appl. No.: 697,066

[30] Foreign Application Priority Data

Jan. 12, 1967 Great Britain........................1,757/67

[52] U.S. Cl...........................................................179/27 CA

[51] Int. Cl...........................................................H04m 3/60

[58] Field of Search..........179/27 CA, 18 AD, 27 FE, 18 BD

[56] References Cited

UNITED STATES PATENTS

| | | | |
|---|---|---|---|
| 2,806,090 | 9/1957 | Vaniman | 179/27.22 |
| 3,327,065 | 6/1967 | Michalopoulos et al | 179/27.22 |
| 3,384,717 | 5/1968 | Coston | 179/27.02 |
| 3,333,062 | 7/1967 | Young | 179/27.02 |
| 3,327,064 | 6/1967 | Braund et al. | 179/27.02 |
| 3,221,108 | 11/1965 | Seeman et al | 179/27.02 |
| 3,482,052 | 12/1969 | Hestad et al. | 179/18 BD |
| 3,342,934 | 9/1967 | Kohn et al. | 179/18 BD |
| 3,115,552 | 12/1963 | Fulwiler et al. | 179/18 BD |

*Primary Examiner*—Kathleen H. Claffy
*Assistant Examiner*—Thomas W. Brown
*Attorney*—Kirschstein, Kirschstein & Ottinger

[57] ABSTRACT

A P.A.B.X. using reed relay switches having a limited number of "service" units that are arranged to be brought into use as required. Each of these units has a speech transmission bridge arranged for connection between two different outlets of the main switching matrix of the exchange so as to enable a call connection to be set up through the unit involving two transits of the switching matrix. A free one of these units is taken into use under the manual control of an operator when an indicator lamp on the operator's switchboard lights to show that there is a call awaiting attention. The operator accepts such a call by operating switches on the switchboard which extends supervisory, speech and control circuits to the allotted unit for the purpose of enabling the call to be supervised. The switchboard is arranged to enable a single operator to supervise up to five call at a time. Alternatively a "service" unit is automatically taken into use when a party to an existing call wishes to make an "inquiry" call to another extension without releasing the original call.

7 Claims, 12 Drawing Figures

INVENTOR
RONALD SMITHERS
BY [signature]
ATTORNEYS

INVENTOR
RONALD SMITHERS
BY
[signature]
ATTORNEYS

INVENTOR
RONALD SMITHERS
BY
Cushman, Darby & Cushman
ATTORNEYS

Inventor
Ronald Smithers
By [signature]
attorneys

INVENTOR
RONALD SMITHERS
BY
Kemberton, Kemberton & Ortega
ATTORNEYS

Inventor
Ronald Smithers
By [illegible] attys

INVENTOR
RONALD SMITHERS

Inventor
Ronald Smithers
By Fruchter Fruchter & Olinger
Attys

INVENTOR
RONALD SMITHERS
BY
[signature]
ATTORNEYS

Inventor
Donald Smithers
By [illegible], [illegible] Attys

INVENTOR
RONALD SMITHERS
BY [signature]
ATTORNEYS

AUTOMATIC PRIVATE BRANCH EXCHANGE WITH PROVISION FOR OPERATOR ASSISTANCE

This invention relates to private telephone exchanges.

A private telephone exchange is essentially an exchange which is adapted for connection over one or more tielines to at least one other private telephone exchange and/or and/or over one or more junction circuits to an exchange of a public telephone system. With such an exchange a call may be set up between an extension connected thereto and a tieline or a junction circuit or alternatively between two such extensions.

The invention is more particularly concerned with private telephone exchanges of the kind in which a call may be set up on an automatic basis between two extensions. It is usual with this kind of exchange to provide an operator's switchboard so as to enable an operator to receive incoming calls from a tieline or a junction circuit and to set up outgoing calls over such tielines and/or junction circuits.

According to the present invention, in a private telephone exchange of the kind which is adapted to set up a call through the exchange on an automatic basis without the intervention of an operator but which is also adapted to enable a call to be set up with the assistance of an operator, there are provided a plurality of auxiliary circuit units which are arranged to be brought into use as required under the manual control of an operator to provide speech and other connections between the operator's switch board and the rest of the exchange so as to enable the operator to supervise operator-assisted calls.

Figure 1:
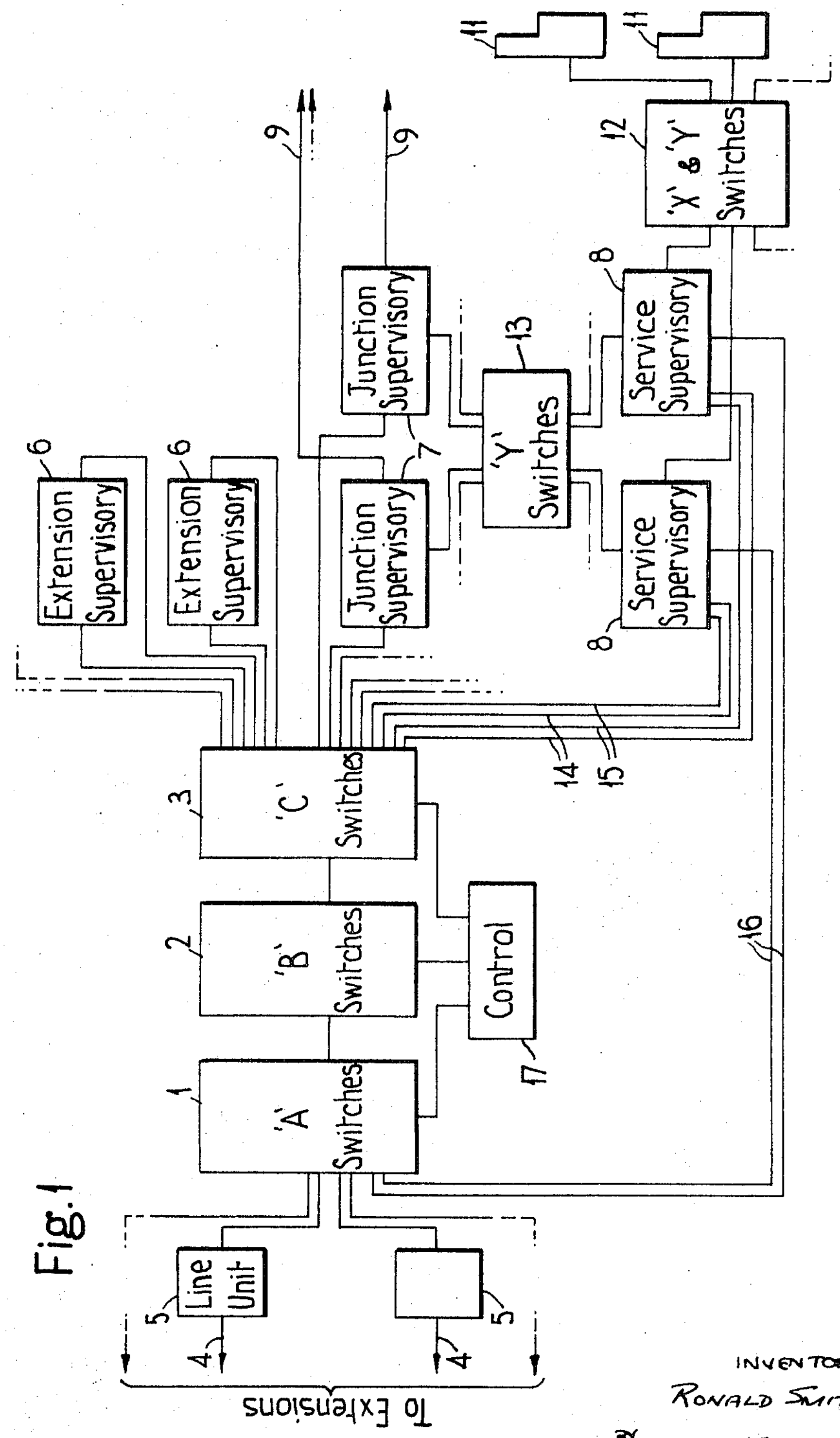
Figure 2:
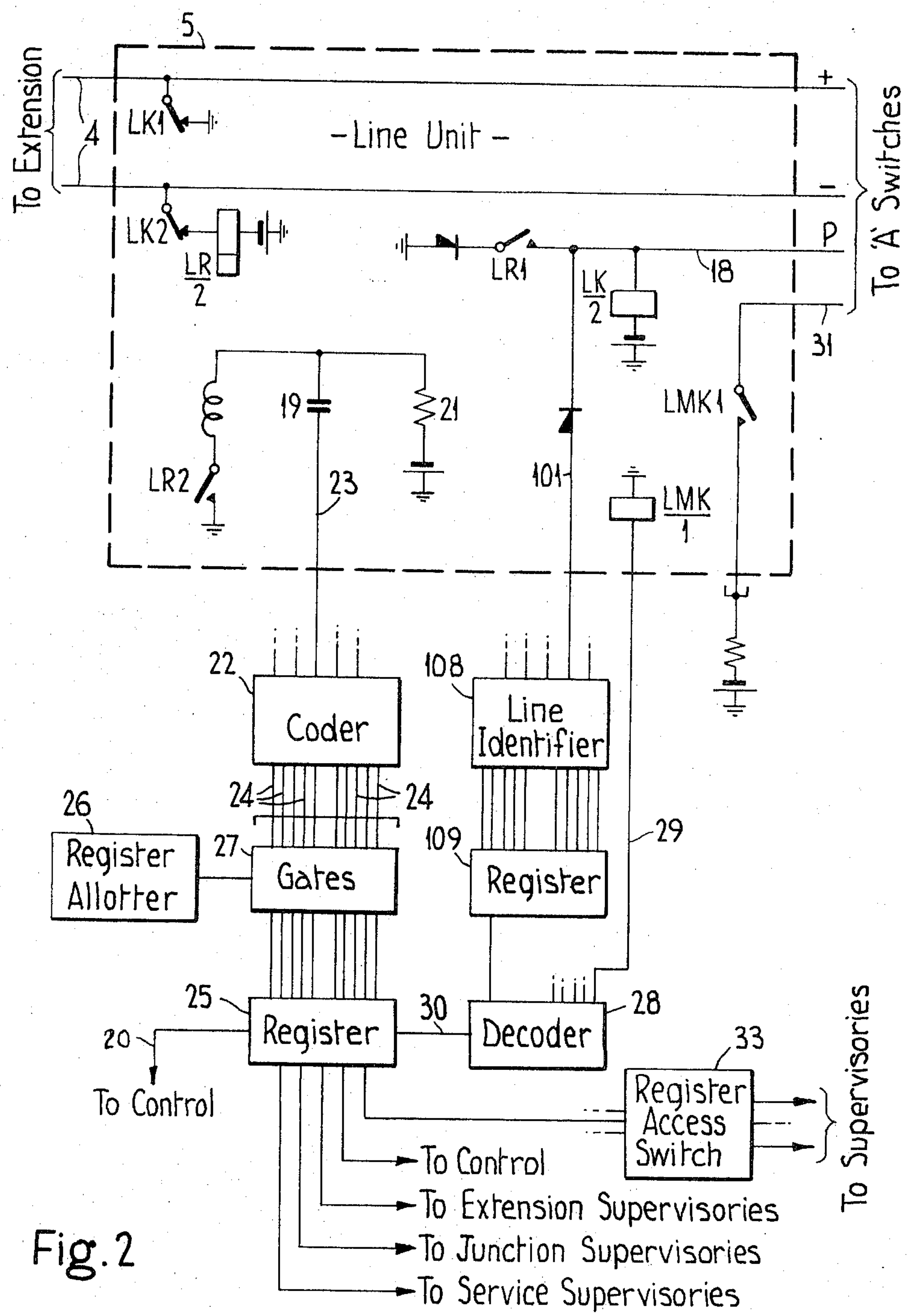
Figure 3:
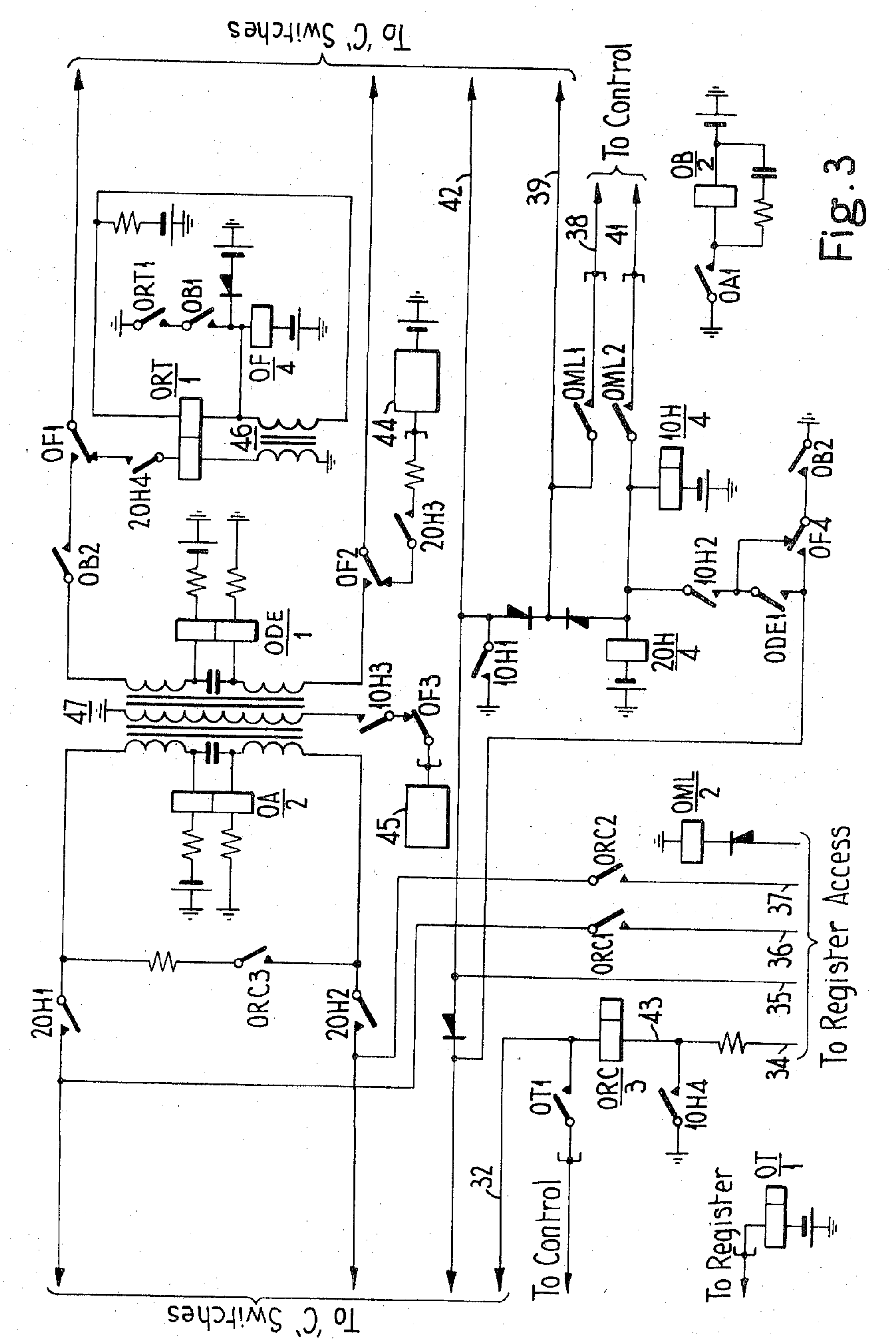
Figure 4:
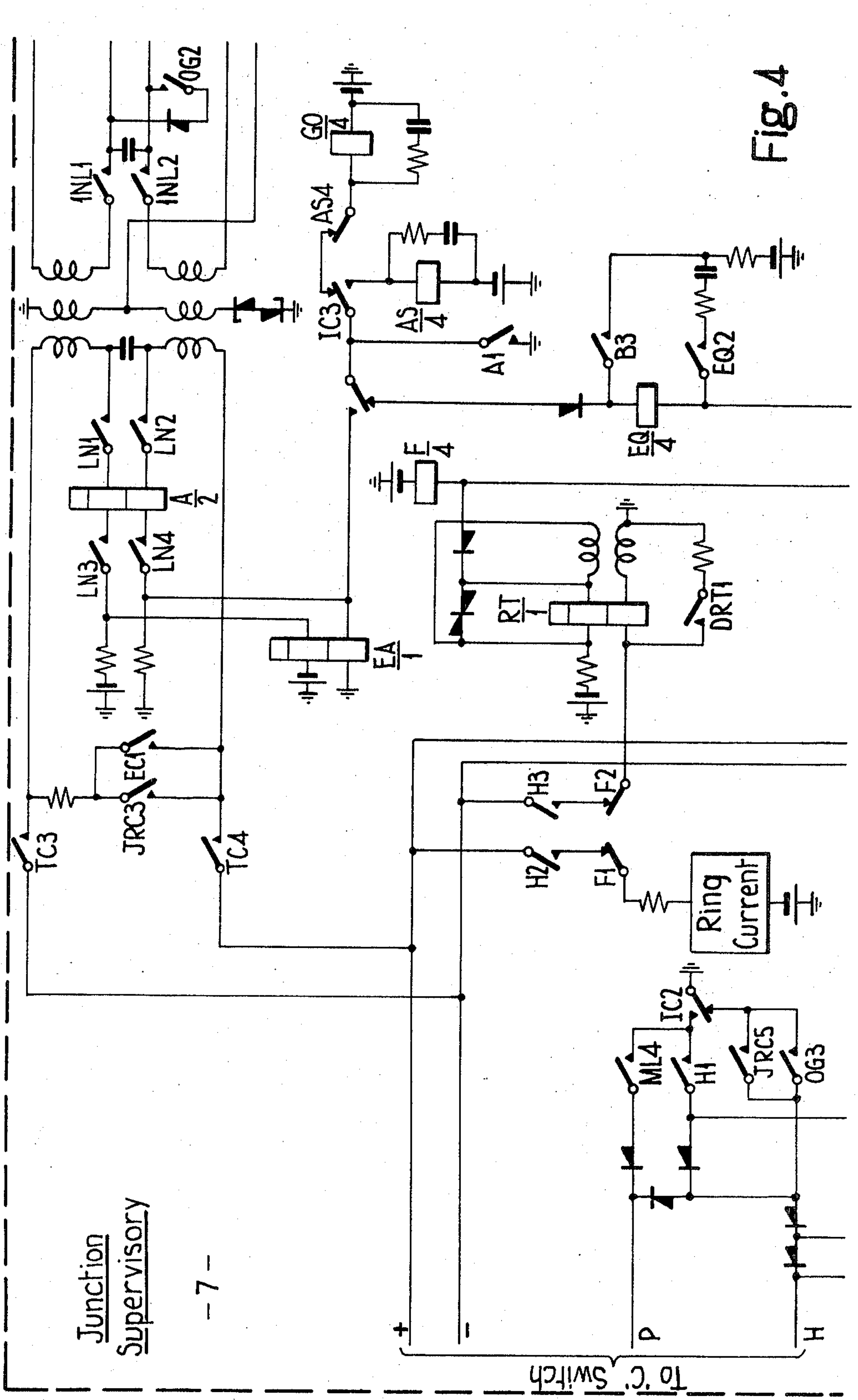
Figures 5, 12:
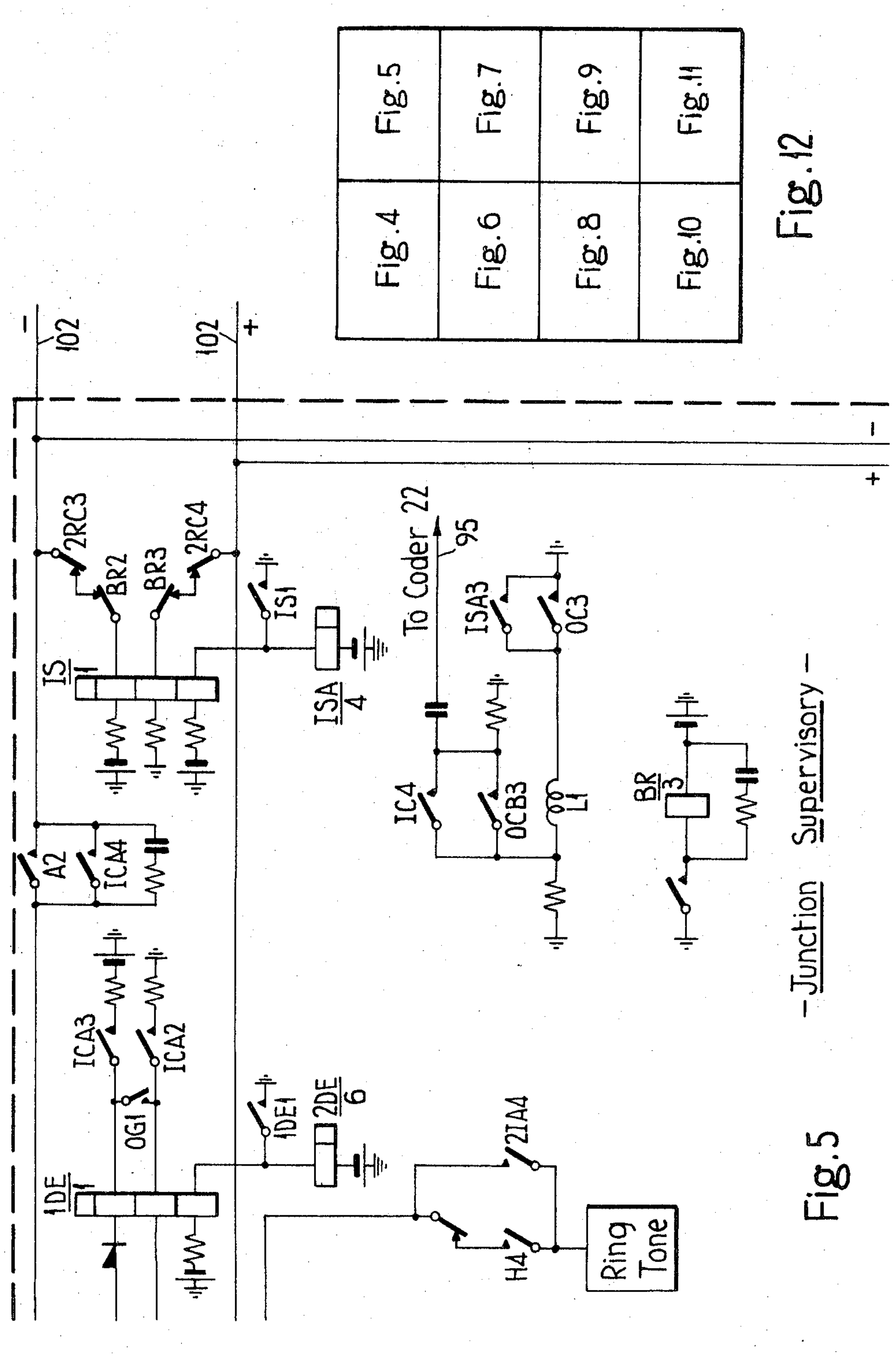
Figure 6:
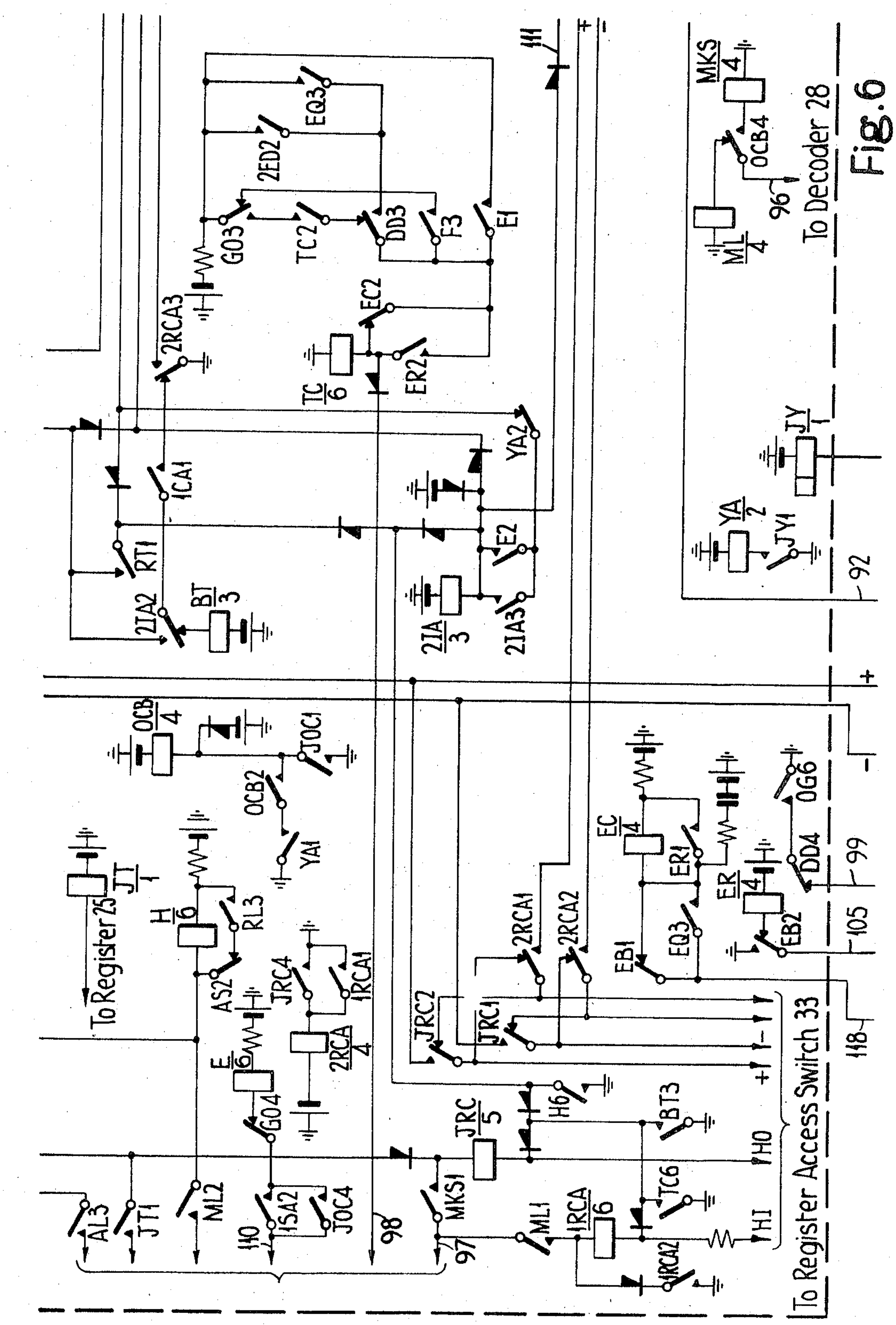
Figure 7:
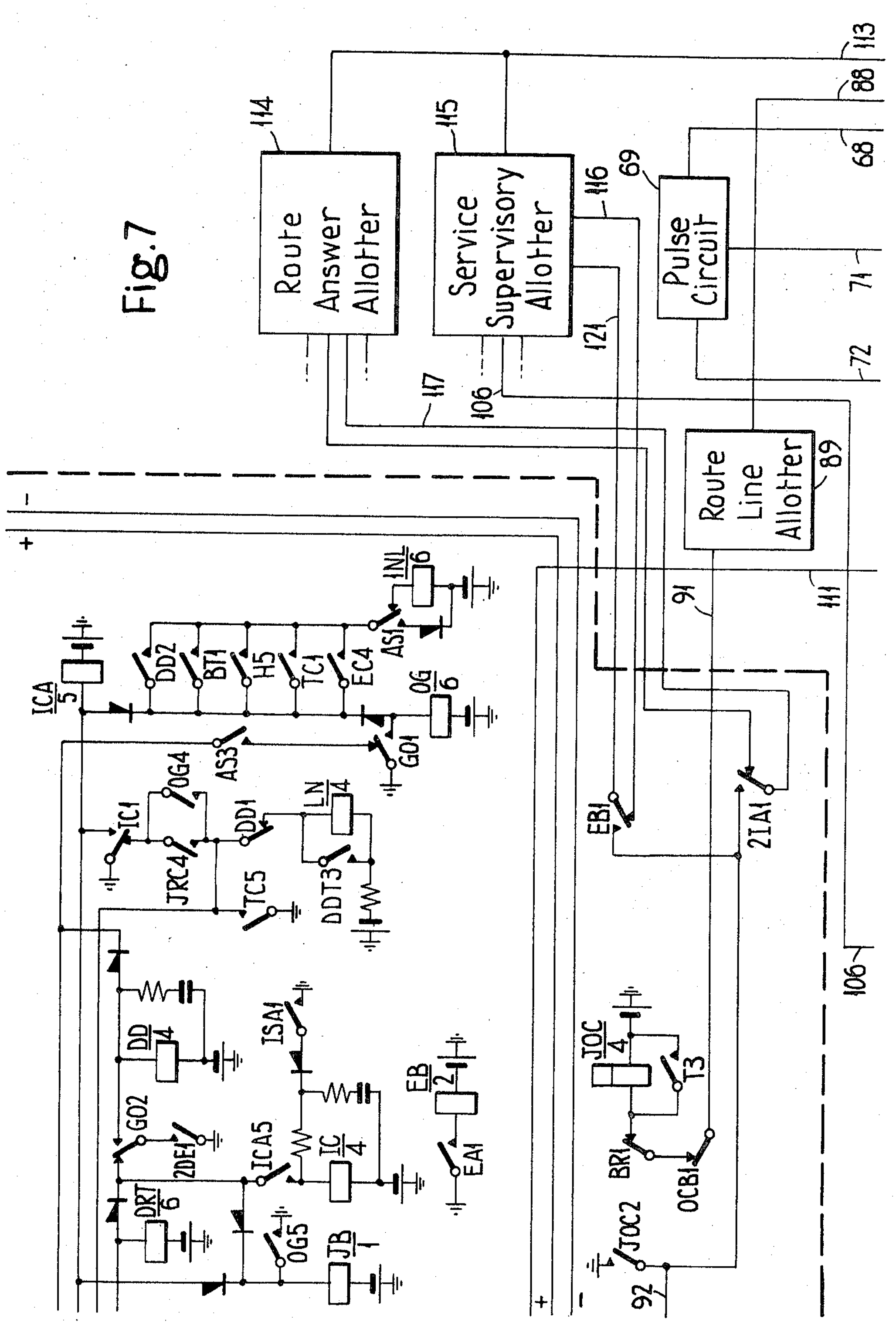

One example of a private exchange in accordance with the present invention will now be described with reference to the accompanying drawings in which FIG. 1 shows the complete exchange diagrammatically, FIG. 2 shows the circuit of one unit of the exchange and diagrammatically shows certain other units that are associated therewith, FIG. 3 shows the circuit of another unit of the exchange, and FIGS. 4 to 11, when arranged as in FIG. 12, show the circuits and interconnections of further units of the exchange.

Referring now to FIG. 1 of the accompanying drawings, the exchange has three successive switching stages 1, 2 and 3. Each of these switching stages 1, 2, and 3 is formed by a matrix of reed relay switches to provide full availability switching, the individual switches of these stages 1, 2 and 3 being subsequently referred to as "A-switches," "B-switches" and "C-switches" respectively. Each of these switches A, B and C is a multipole switch which is adapted, when operated, to extend four paths through the exchange, these four paths being two speech conductors, the associated "private" (or "P") wire, and a "holding" (or "H") circuit for that switch.

The extension parties of the exchange are connected to the switching stage 1 by way of line wires 4, each extension party having an individually associated line unit 5.

The switching stage 3 is connected to three types of supervisory units 6, 7 and 8. These three types of unit will subsequently be described in more detail and it is sufficient to say here that a unit 6, which is subsequently referred to as an "extension supervisory," is used for a call between two extension parties while a unit 7, which is subsequently referred to as a "-junction supervisory," is used for a call between an extension party and a line 9 which may, for example, be a tieline to another exchange. Each line 9 has its associated junction supervisory 7.

There is also provision for calls through the exchange to be set up and/or supervised by an operator and for this purpose there are a plurality of operators' switchboards 11 each of which is in the form of a console. Such a call involves one of the units 8 (which is subsequently referred to as a "service supervisory").

Each switchboard 11 is adapted to handle five calls at a time and for this purpose is provided with five call control circuits (not shown in FIG. 1). Connections between the switchboards 11 and the service supervisory 8 are effected by way of X- and Z-switches which together effectively form a full availability switching stage 12 so that any one of said control circuits may be "connected" to any service supervisory 8. Connections between the junction supervisories 7 and the service supervisories 8 are effected by way of a full availability switching stage 13 which is formed by a matrix of Y switches. The X-, Y- and Z-switches are preferably reed switches.

It may be mentioned here that each service supervisory 8 is connected to two outlets of the switching stage 3 by way of leads that are represented by the lines 14 and 15 respectively and is also connected to an inlet of the switching stage 1 by way of leads represented by a line 16.

When a connection is to be set up through the switching stages 1, 2 and 3, the appropriate A-, B- and C-switches that identify a free path through those stages are operated in known manner by common control apparatus 17. Although the exchange may handle a plurality of calls at any time, the control apparatus 17 is only capable of dealing with one call at a time and is brought into use, for the purpose of supplying the necessary control signals to enable a connection to be made through the stages 1, 2 and 3, as required.

Those parts of the exchange that are relevant to an understanding of the present invention will now be described in more detail. Referring first to FIG. 2 of the accompanying drawings which shows the circuit of the line unit 5 and various items of equipment to which the line unit is connected, the unit 5 has a slow-to-release relay LR which is operated when the appropriate extension party initiates a call by looping the line wires 4. Contacts LR1 closing apply earth potential to the P-wire 18 so as to "busy" the line unit in question. Closure of contacts LR2 complete a discharge path 4 a capacitor 19 that was previously charged by way of a resistor 21 so that a pulse is supplied to a coder 22 over the lead 23.

The coder 22 is common to all the line units 5 of the exchange and is of the Dimond ring type. This coder in fact comprises a plurality of sets each of five ferrite cores, each of these sets corresponding to one decimal digit of an extension number and each lead 23 threading through two of the cores of each such set. Thus when a pulse is supplied over the lead 23, signals are supplied by the coder 22 over a group of leads 24, these signals characterizing the number of the calling extension according to a two-out-of-five code.

The exchange also has a plurality of registers that are used for temporarily storing information while a call is being set up and one such register 25 is shown in FIG. 2. A register alloter 26 is arranged normally to connect the coder 22 by way of gates 27 to a free register 25. Thus, when a pulse is supplied over the lead 23 to characterize a calling extension party, signals are supplied by the coder 22 to the register 25 that is then allocated thereto and the register 25 stores the appropriate coded number. A common decoder 28 is connected to each register 25 (over a group of leads represented by the line 30) and upon a number being stored by the register 25 in the manner just discussed, the decoder 28 causes a signal to be supplied over a lead 29 that is individual to the line unit 5 of the extension party in question.

The signals supplied over the lead 29 by the decoder 28 causes a relay LMK in the line 5 to be operated and contacts LMK1 closing cause negative potential to be applied to the lead 31 for the purpose of marking the appropriate inlet to the switching stage 1 (FIG. 1).

The register 25 also supplies a signal over a lead 20 to the common control apparatus 17 which then causes a connection to be set up through the switching stages 1, 2 and 3 from the line unit 5 to a free extension supervisory 6.

Referring now also to FIG. 3 of the accompanying drawings which shows the circuit of the extension supervisory 6, negative potential supplied by one of the C-switches over the "-hold" wire 32 results in operation of a relay ORC and a relay (not shown) in a register access switch 33 (FIG. 2) so as to connect the leads 34 to 37 through to the register 25 that had already been allocated to the call in question. This register 25 then supplies dial tone signal to the calling extension by way of the register access switch 33, leads 36 and 37, relay contacts ORC1 and ORC2, the operated A-, B- and C-switches and the calling extensions line unit 5. The calling party then dials the number of the wanted extension, impulses representing that number being passed back to the register 25 over the route just described. Signals representing the number of the wanted extension are passed by the register 25 to the decoder 28 which then supplies a signal over the appropriate wire 29 to operate the relay LMK in the line unit 5 of the wanted extension party. At this time the relay OML is operated from the register access switch 33 so that negative potential is subsequently supplied by the control apparatus 17 over a lead 38 and is applied to the lead 39 to mark one of the outlets of the switching stage 3. The control apparatus 17 is then reoperated to set up a connection through the switching stages 1, 2 and 3 between the inlet to stage 1 that is marked by the relay LMK in the line unit 5 of the wanted extension party being operated and the marked outlet of the stage 3. When this connection is set up the control apparatus 17 temporarily connects a lead 41 to earth so as to operate relays 10H and 20H in the extension supervisory.

Upon operation of the relay 20H, contacts 20H1 and 20H2 extend the direct current loop from the calling party extension to operate a relay OA while contacts 1OH4 earth the lead 43 so as to release the relay ORC and thereby disconnect the extension supervisory 6 from the register access switch 33. Relay OB is operated via contacts OA1 and relays 1OH and 20H are held operated at this time by way of contacts 10H2 and OB2. Contacts 20H3 and 20H4 establish a path for the supply of ringing current from a generator to the called extension while contacts 10H3 cause ringing tone to be fed back to the calling extension from a source 45.

The supply of ringing current does not cause operation of relay ORT since ringing current is supplied in antiphase to the two windings of that relay by way of a transformer 46. When however the called party answers, the resulting flow of direct current through one winding of the relay ORT causes that relay to operate so as to complete the operating circuit or relay OF by way of contacts ORT1 and OB1. Contacts OF1 and OF2 interrupt the supply of ringing current and at the same time extend the speech path from the called extension so that the relay ODE is operated and the two extension parties are connected by way of the transmission bridge 47. Contacts OF3 interrupt the supply of ringing tone to the calling extension while contacts OF4 change the holding circuit for the relays 10H and 20H so that those relays are released when either the relay OA or ODE is released when either extension party clears down.

Figure 9:
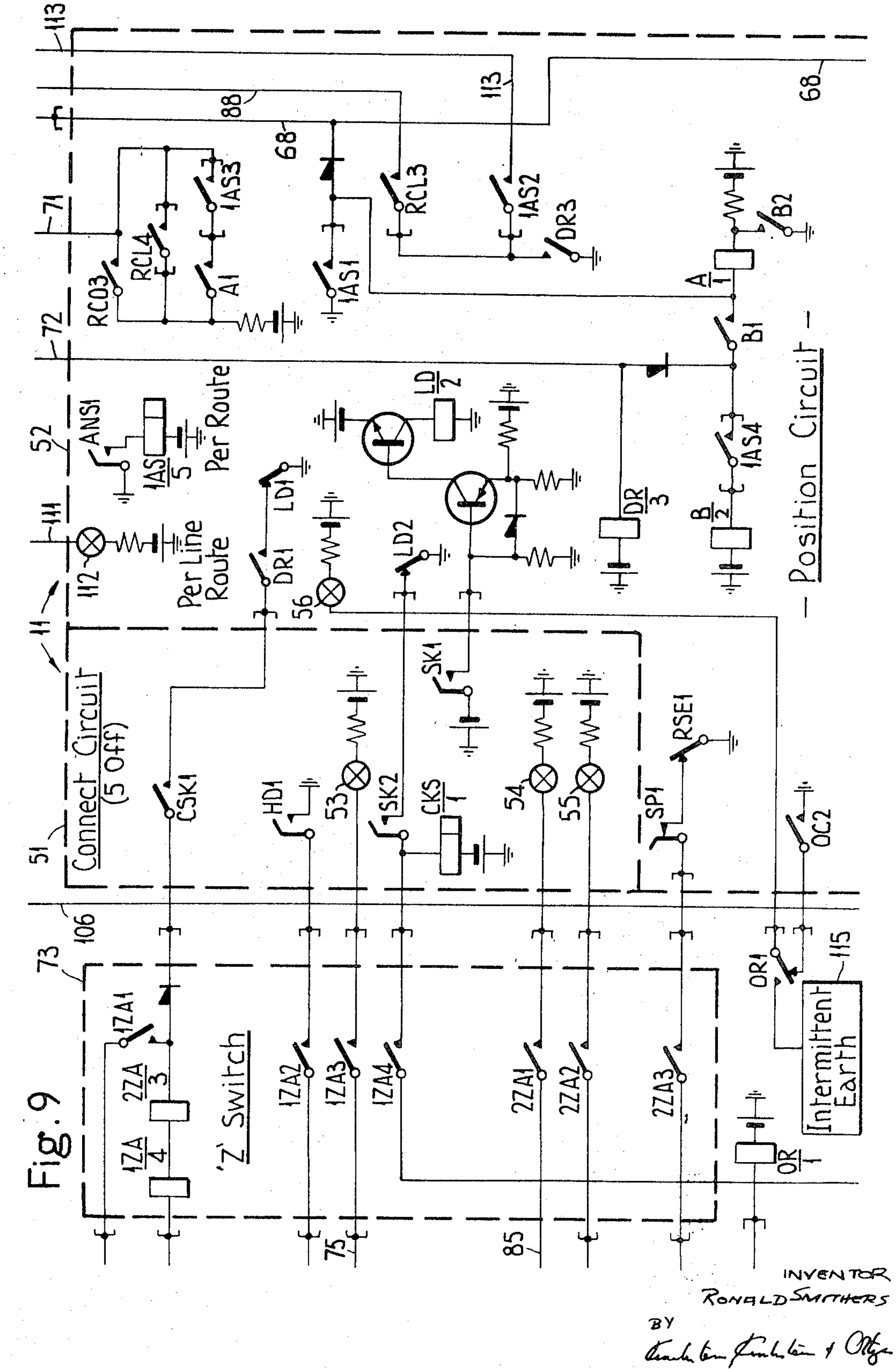
Figure 11:
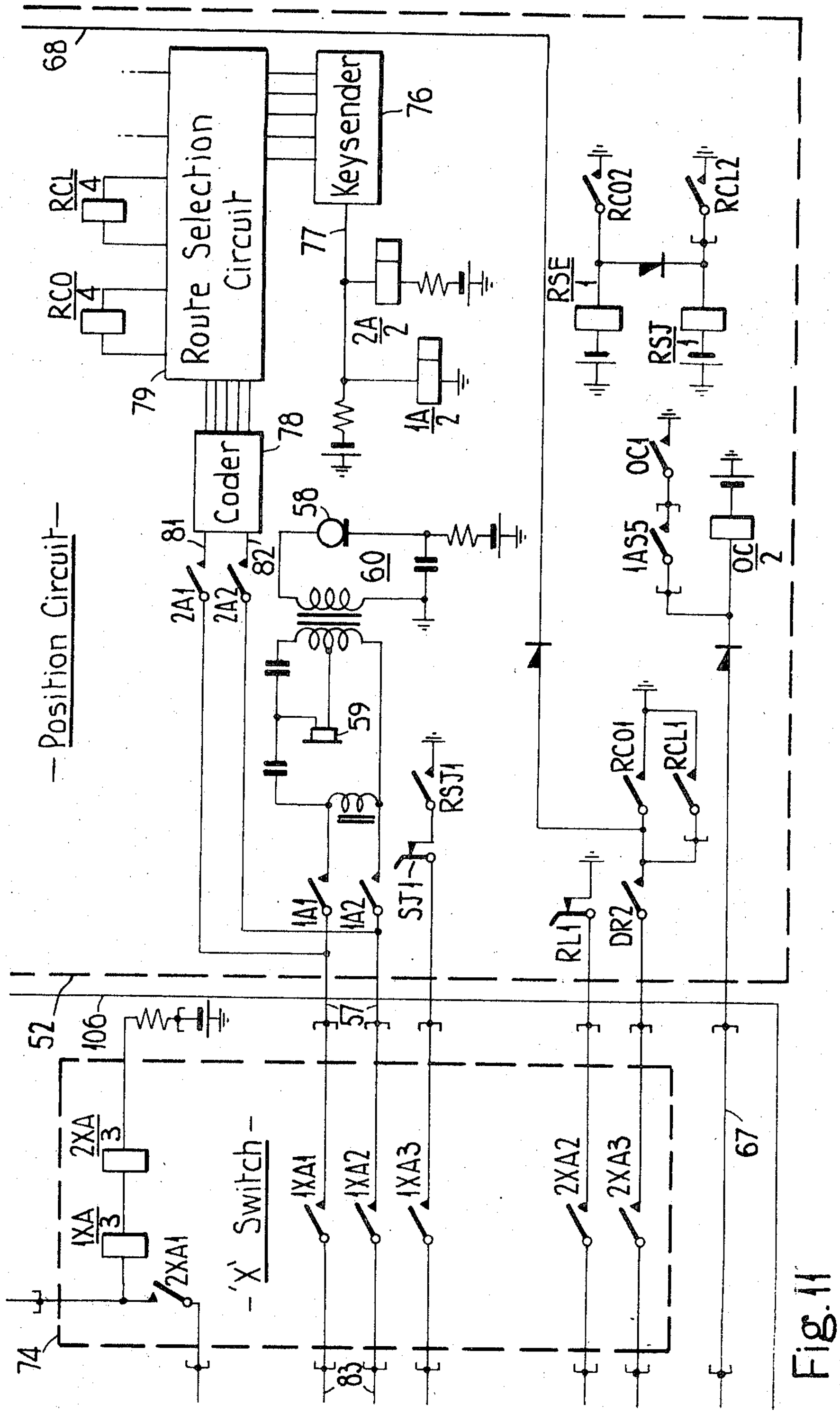

Referring now to FIGS. 9 and 11 which show the circuit of one of the operator's switchboards 11 (FIG. 1), the switchboard has five like call connect circuits 51 (of which only one is shown in the drawings) so as to enable the operator at that switchboard to supervise up to five calls at a time and a position circuit 52 that is common to that operator's position. Each connect circuit 51 presents to the operator three indicator lamps 53, 54 and 55, a nonlocking key switch SK and a locking key switch HD. The position circuit 52 presents to the operator a plurality of route indicator lamps (of which only one of several route lamps 112 and the lamp 56 are shown) together with three nonlocking key switches SP, SJ and RL and a plurality of route key switches ANS (of which only one is shown). (Only the contacts SK1, SK2, HD1, SP1, SJ1, RL1 and ANS1 of these key switches are shown in the drawings. These key switches may conveniently be of the pushbutton type.) The circuit 52 also includes a key sender 76 which has 10-digit keys (corresponding to the digits "0" to "9").

It may be mentioned here that, as far as an operator is concerned, a "route" is the direction of a party to whom connection is to be made (either as a calling or called party). Thus the tieline (or lines) from the exchange to each remote exchange constitute one such route while all calls to an extension party of the exchange under consideration are over another route.

It will be noted that a pair of leads 57 from the position circuit 52 provide a two-way speech path to the operator's speech circuit 60 (which includes a microphone 58 and a telephone receiver 59) by way of normally closed relay contacts 1A1 and 1A2.

As previously explained, each switchboard 11, and in particular each connect circuit 51, may be connected to any one of the service supervisories 8 (FIG. 1). In fact the switching stage 12 comprises a matrix of X-switches and a matrix of Y-switches. The X-switch matrix enables any position circuit 52 to be extended to any one of the service supervisories 8. Similarly the Z-switch matrix enables any connect circuit 51 (of any switchboard 11) to be connected to any service supervisory 8. It will be appreciated therefore that an operator may be "connected" to any service supervisory 8 for the purpose of supervising a call merely by operating one X- and one Z-switch.

Operator-assisted extension-to-extension call

The manner of effecting a connection on an automatic basis between two extension parties has already been described herein. If however such a call is to be set up with the assistance of an operator, a connection is first set up as previously through the switching stages 1, 2 and 3 to an extension supervisory 6 and through that supervisory 6 and the register access switch 33 to a register 25. In this case, instead of the calling party dialling the number of the wanted extension, he dials a particular digit, for example the digit "0," to call in an operator. This characteristic digit is recognized by the register 25 and a signal is supplied over a lead 61 (FIG. 2) to all the service supervisories 8.

Figure 8:
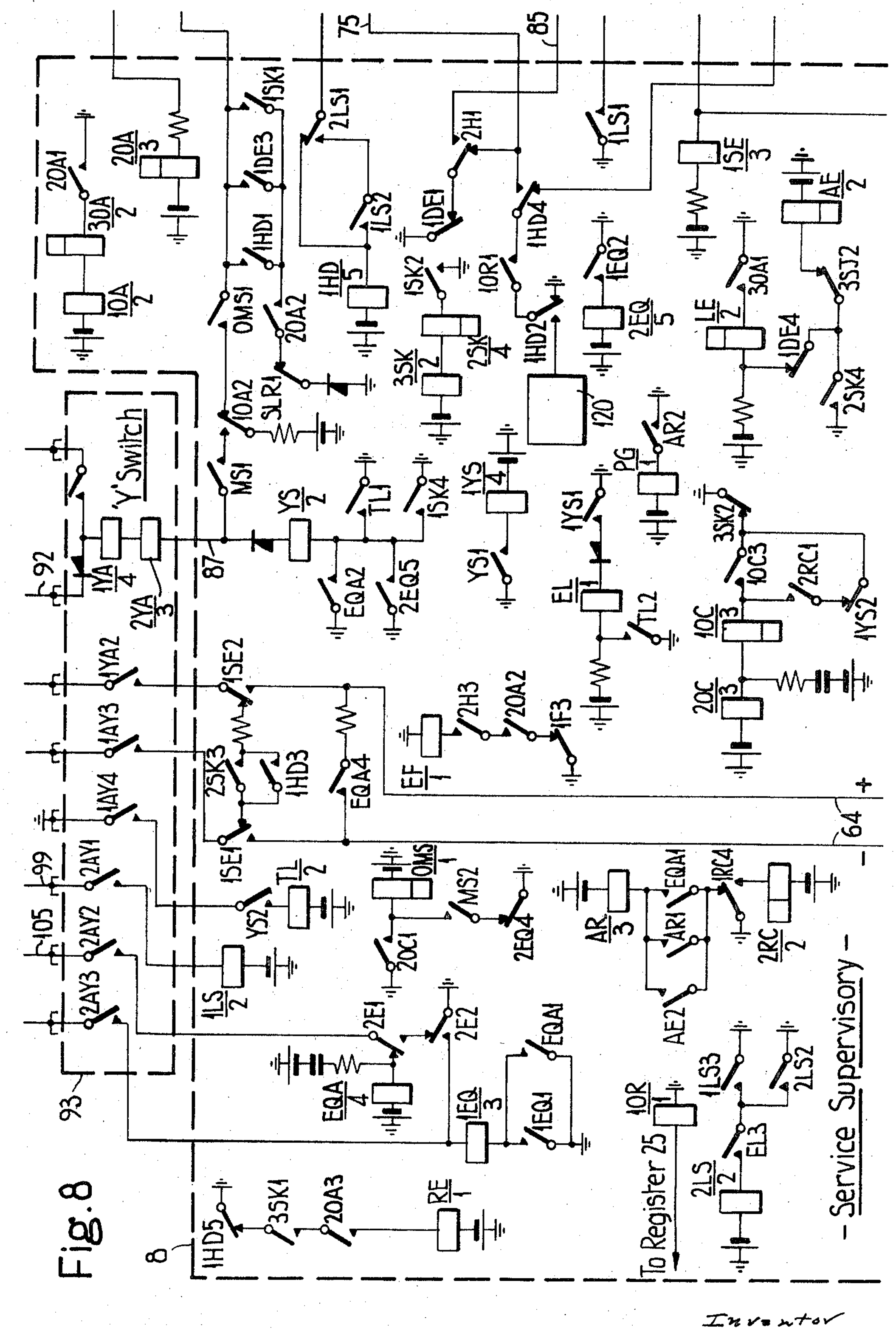
Figure 10:
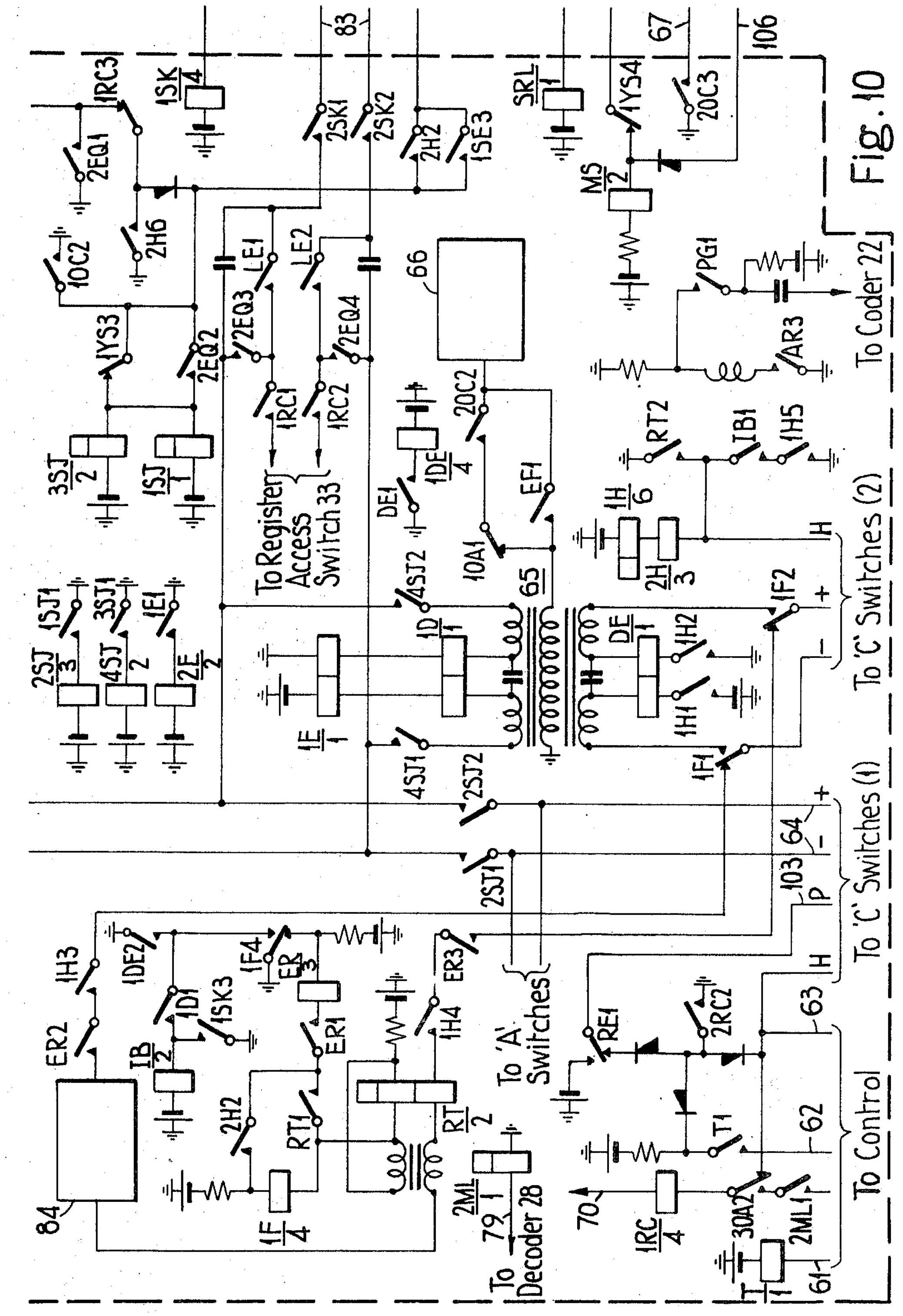

Referring now also to FIGS. 8 and 10, the signal supplied over lead 61 causes the relay T in each service supervisory 8 to be operated. Contacts T1 close so as to cause negative potential to be applied to the leads 62 if the service supervisory 8 is free or earth potential if that supervisory is busy. The common control apparatus 17 inspects the leads 62 from all the service supervisories 8 and applies a positive marking potential to the lead 63 of the service supervisory 8 that is allocated thereby to the call under consideration. This marking potential causes relay 1RC to be operated, the lead 70 being connected to the "hold" wire of the register access switch 33 which at this time is effectively earthed. Contacts 1RC4 complete the operating circuit for relay 2RC which thus operates and contacts 2RC1 close to cause relays 10C and 20C to be operated. A holding circuit for relays 10C and 20C is then established by way of contacts 10C3 and 2SK5.

The common control apparatus 17 then causes a new connection to be set up through the switching stages 1, 2 and 3 between the calling extensions line unit 5 and the allocated service supervisory 8. As far as the service supervisory 8 is concerned, this connection is effected utilizing the group of four leads marked "To C switches (1)" in FIG. 10 and when the connection is set up the original connection through the switching stages 1, 2 and 3 to an extension supervisory 6 is broken down by releasing the A, B and C switches that were previously operated.

Closure of contacts 10C2 causes relays 1SJ and 3SJ to be operated at this time while relays 2SJ and 4SJ are also operated by way of contacts 1SJ1 and 3SJ1. Relay OMS is aLso operated by way of contacts 20C1.

Contact 2SJ1, 2SJ2, 4SJ1 and 4SJ2 being closed extend the leads 63 (which are connected back to the calling extension party by way of operated A-, B- and C-switches) to a transmission bridge 65 thereby causing relay 1D to operate. Ringing tone is supplied by a source 66 to the transmission bridge 65 by way of contacts 20C2 so that ringing tone is passed back to the calling party.

On operation of relay 10C as aforesaid, contacts 20C3 cause a lead 67 to be earthed and this in turn operates relays OC in all the switchboards 11 (FIG. 1). Contacts OC2 closing complete a circuit to light the assistance call lamp 56 on each switchboard.

An operator accepts the call by operating the assistance route answer key ANS and the speak key SK of a connect circuit 51 that is not at that tine in use. Contacts ANS1 of the assistance route answer key are closed upon operation of that key and the associated relay 1AS is thereby operated. Contacts 1AS5 then complete a holding circuit for the relay OC.

Upon operation of the relay 1AS, contacts 1AS1 apply earth potential to a lead 68 which causes a pulse circuit 69 (FIG. 7) to commence operations. At the same time a relay A is operated. The pulse circuit 69 tests the leads 71, each extending from one of the position circuits 52, to find the one that is at a negative potential due to contacts A1 and 1AS3 being closed. When the appropriate position circuit 52 is found by the pulse circuit 59, a positive-going pulse of approximately 50 milliseconds duration is applied over the lead 72 appropriate to that position circuit. This pulse causes relay DR to operate.

Operation of the speak key SK in one of the connect circuits 51 as aforesaid results in the operating circuit of an associated relay CSK being completed via contacts SK2. Contacts DR1 and CSK1 thus extend an earth connection to one side of the Z switch 73 while positive potential is applied to the other side of that switch by way of contacts OMS1 in the service supervisory associated with the call under consideration. Relays 1ZA and 2ZA of the Z-switch 73 are thus operated. Contacts 1ZA1 complete the operating circuit of a relay 20A and slave relays 10A and 30A are operated via contacts 20A1. The operation of changeover contacts 10A2 interrupt the circuit over which the relays 1ZA and 2ZA were operated but a holding circuit for those relays (and for the relay 20A) is established at this time by way of contacts RL1, 20A2 and 1DE3.

Upon operation of the relay 1ZA, contacts 1ZA4 complete an operating circuit for the relays 1XA and 2XA of the associated X-switch 74 and when these relays are operated a holding circuit therefore is established by way of contacts 2XA1. The operating winding of a relay 1SK in the appropriate service supervisory is also operated at this time.

Reverting now the positive-going pulse that was supplied over the lead 72 to operate the relay DR, this pulse is also supplied by way of operating contacts 1AS4 to operate a relay B. Contacts B1 cause relay A to release and subsequently, after relay 1AS releases following the return of the operated key switch ANS to its normal position, relay B is also released.

Release of the relay 1AS breaks the holding circuit of relay OC so that contacts OC2 are opened and the lamp 56 is extinguished.

In the service supervisory, operation of relay 1SK completes the operating circuit of relay 2SK by way of contacts 1SK2. Contacts 2SK5 interrupt the holding circuit or relays 10C and 20C which thus release. The supply or ringing tone to the transmission bridge 65 (and thus to the calling extension party) is therefore stopped.

At this time the lead 75 in the service supervisory is earthed. A circuit is thus established by way of contacts 1ZA3 to energize and light the lamp 53 in the appropriate connect circuit 51 so as to indicate a "waiting" condition.

At this time the relay 1A in the position circuit 52 is operated with the result that a speech connection is set up between the wires 63 (which as previously mentioned are connected through the stages 1, 2 and 3 to the calling party) and the operator's speech circuit 60 by way of contacts 1A1 and 1A2, 1XA1 and 1XA2, 2SK1 and 2SK2, and 2SJ1 and 2SJ2. The operator can thus speak to the calling party.

When the operator has been advised the number of the required extension party to which connection is to be made, she first presses the key of the key sender 76 appropriate to the digit "0". As soon as any digit is keyed by the key sender 76, earth potential is applied to a lead 77 for a predetermined period so as to release the relay 1A and operate the relay 2A. This has the effect of connecting a coder 78 through to the service supervisory in place of the operator's speech circuit 60. Binary coded signals representing the digit "0" (according to a two-out-of-five code) are supplied by the key sender 76 to the route selection circuit 79. The circuit 79 is adapted to respond to signals supplied thereto representing certain digits or combinations of digits that are characteristic of a particular "route." As far as the call under consideration is concerned, the route selection circuit 79 causes a relay RCO to operate in response to the digit "0" being keyed and at the same time the key sender 76 is connected through to the coder 78.

Upon operation of relay RCO, contacts RCO1 again apply earth potential to the lead 68 so as to initiate operation of the pulse circuit 69. As previously a pulse is subsequently supplied over the lead 72 to operate relay DR. Relay RSE is operated via contacts RCO2 and contacts RSE1 interrupt the operating circuit of the relay 1SE which was previously operated and is now released. Contacts 1SE1 and 1SE2 thus are returned at this time to the positions shown in the drawing thereby isolating the speech path from the Y-switches.

Following release of relay 1SE, relay 2SE is released. This causes relay AE to operate and contacts AE2 then complete the operating circuit for relay AR. Contacts AR2 closing cause relay PG to operate and this in turn causes a pulse to be supplied over a lead 81 to the coder 22 (FIG. 2), the capacitor 82 being discharged for this purpose in the same manner as capacitor 19 in the line unit 5. The free register 25 (FIG. 2) that is associated with the coder 22 at that time is then brought into use and is arranged in the manner previously described to store digital information that is characteristic of the service supervisory 8 being used for the call under consideration. As a result the decoder 28 (FIG. 2) supplies a signal over lead 79 (only shown in FIG. 10 but corresponding, as far as the service supervisory in question is concerned, to the lead 29 in FIG. 2) to operate relay 2ML in the appropriate service supervisory 8.

Connection to the register 25 discussed in the last paragraph is made to the speech wires 82 that are connected to the position circuit 52 by way of contacts 1XA1 and 1XA2 of the operated X switch, contacts 2SK1 and 2SK2, contacts LE1 and LE2 (the relay LE being operated at this time over contacts 30A4) and contacts 1RC1 and 1RC2 (the relay 1RC having been reoperated from the common control apparatus 17 over contacts 2ML1).

The operator then presses in turn the keys of the key sender 76 that are characteristic of the wanted extension party and the coder 78 converts the signals received thereby from the key sender 76 into a form suitable for transmission to the register 25 over the path discussed in the last paragraph. The coder 78 may, for example, represent each decimal digit by a combination of one-out-of-four unidirectional voltages applied to each of the wires 81 and 82 in known manner.

The signals supplied by the coder 78 to characterize the number of the called extension party are thus passed to the allotted register 25 which then stores information to identify both the called party and the service supervisory 8 that is in use for this call. As soon as all this information is stored, the register 25 signals to the common control apparatus 17 to make a connection through the switching stages 1, 2 and 3 between the line unit 5 of the called party and the group of leads in the service supervisory that are designated "To C Switches (2)."

When this connection is effected through the stages 1, 2 and 3, relays 1H and 2H in the service supervisory are operated. Changeover contacts 2H1 remove the earth from lead 75 and apply it to lead 85. As a result the waiting lamp 53 in the connect circuit 51 is extinguished and the "exchange" lamp 54 is lit.

The supply of ringing current from a source 84 to the called extension party and the subsequent cessation of that current (when the relay DE is operated upon the called extension looping his line wires) is controlled by relays 1H, RT, ER and 1F in similar manner to the corresponding circuit (including the relays 10H, ORT and OF) in the extension supervisory (FIG. 3).

The relay DE operating when the called party answers results in the relay 1DE being operated and contacts 1DE1 interrupt the energizing circuit of the lamp 54 in the connect circuit 51.

The required call between two extension parties is thus set up and all the lamps in the connect circuit 51 that had been used to supervise the setting-up of the call are extinguished. The service supervisory is retained through the call and the appropriate X- and Z-switches initially remain operated so that at any time the operator can break into the call merely by operating the speak key CSK in the connect circuit 51 so as to reoperate relays 1SK and 2SK. The operator may however completely withdraw from the call by operating the release key RL of the position circuit 52 to open contacts RL1. This causes relay SRL (which was previously operated) in the service supervisory 8 to release and contacts SRL1 to open in the hold circuit of the relays 1ZA and 2ZA. The operated Z-switch is thus released and this in turn releases the operated X-switch.

Operator-assisted extension-to-tieline call

In this case the calling extension party establishes a connection to an operator by dialing "0" in exactly the same manner as in the operator-assisted extension-to-extension call previously considered. When the operator has been advised the identity of the tieline route over which connection is required, the operator presses the digit keys of the key sender 76 that are appropriate to that route. This causes operation of a relay RCL that is characteristic of the required route. (It is to be understood that although only one relay RCL is shown in the drawings there may in fact be a plurality of such relays each associated with a particular tieline route.) Closure of contacts RCL1 of this relay complete the operating circuit of relay MS in the allocated service supervisory by way of the appropriate X switch that is operated at this time. Since relay 10A is already operated, the closure of contacts MS1 apply positive potential to the Y-switches over a lead 87.

Referring now also to FIGS. 4 to 7, relay DR has been operated at this time by a pulse supplied by the circuit 69 and closure of contacts RCL3 thus apply earth potential over a lead 88 to a line allotter 89 for the route in question. The allotter 89 operates to find a free line of the required route. The allotter 89 earths the lead 91 connected to the junction supervisory 7 associated with the allotted line and this causes relay JOC in that junction supervisory to be operated. Contacts JOC1 complete a circuit to operate relay OCB while contacts JOC2 mark a lead 92 that is connected to the Y-switch matrix by earthing it. Accordingly the relays LYA and 2YA of the Y-switch 93, that is on one side connected to the service supervisory 8 that is in use for this call and on the other side to the allotted junction supervisory, are operated. A holding circuit for relays 1YA and 2YA is established via contacts 1YA1 (in the Y switch 93) and contacts 1SK4 in the service supervisory 8. (It will be appreciated that at the time the operator keys the route digits that result in the Y-switch 93 being operated, the key switch SK in the appropriate connect circuit 51 is operated so that the relay 1SK is already operated.) Relays JY (in the junction supervisory 7) and relay YS (in the service supervisory 8) are thus operated as are slave relays JYA and 1YS.

Upon operation of relays JOC and OCB, a pulse is supplied over a lead 95 to the coder 22 in the manner previously described herein for the purpose of taking into use a free register 25 and reading into that register information concerning the identity of the junction supervisory in question. The decoder 28 then supplies a signal over lead 96 to operate relay MKS, this lead 96 being unique to the junction supervisory associated with this call. Subsequently a signal from the common control apparatus 17 is supplied to a lead 97 and this causes relay 1JRC to operate. Slave relays 2JRC and 2RCA are also operated.

A signal supplied over lead 98 by the common control apparatus 17 causes relay TC to operate and contacts TC5 complete a circuit to operate relay LN.

Contacts of operated relays JRC and LN complete a circuit to operate relay A and contacts A1 closing cause relay GO to operate and contacts GO1 complete the operating circuit or relay OG. Contacts OG6 apply earth potential to a lead 99 which is connected through the operated Y-switch 93 with the result that relay 1LS in the service supervisory is operated. Contacts 1LS1 complete the energizing circuit of the "line" lamp 55 in the connect circuit 51.

The signal supplied over lead 97 also operates relay H by way of contacts MKS1. Relay 1NL is then operated by way of contacts G01, H5 and AS1. As a result a calling loop is applied to the outgoing line wires 102 by way of contacts A2, 1NL1, OG2, 1NL2. Substantially in the manner previously described ringing tone is then returned to the calling extension party by way of contacts H2 and H3.

When the distant exchange answers the polarity of the line wires 102 is reversed at that exchange with the result that the relay 1DE in the junction supervisory is operated. This in turn causes operation of relays 2DE, DD, IC and ICA. Contacts DD4 opening remove the earth connection from the lead 99 with the result that the "line" lamp 55 in the connect circuit 51 is then extinguished. Relays GO and OG substantially release.

The operator may then speak selectively to either the distant exchange or to the calling extension party by operating either the "speak junction" key SJ or the "speak exchange" key SP in the position circuit 52. The calling extension party and the distant exchange are then connected and the operator may retire from the call. For this purpose the "speak" key SK in the appropriate connect circuit 51 is released and this releases relay 1SK in the service supervisory and interrupts the holding circuit for the relays 1XA and 2XA so that the operated X switch 73 is then released. Contacts 3SK1 restoring complete the operating circuit for a relay RE and contacts RE1 apply negative potential to the P-wire 103. This negative potential is fed back to the line unit 5 (FIG. 2) of the calling extension party by way of the P-wire through the operated A-, B- and C-switches and is passed from the line unit 5 over a lead 101 to a line identifier 108 (FIG. 1) so as to start a sequence of operations to effect a new direct connection through the switching stages 1, 2 and 3 between the line unit 5 of the calling extension party and the junction supervisory 7 over which the call has already been established. (The line identifier 108 is common to the whole exchange and is similar to the coder 22. It has an associated register 109, corresponding to the register 25, which passes signals characterizing a particular line to the decoder 28 so as to mark a lead such as the lead 29.) When the new connection is established, the operated Y- and Z-switches are restored so as to release the service supervisory 8 that had initially been used in setting up the call.

On some occasions the operator may wish to retain supervision of a call after it has been set up and this may be done by the operator operating the "hold" key HD in the appropriate connect circuit 51. The contacts HD1 of this key switch complete a circuit to operate relay 1HD in the service supervisory and contacts 1HD1 ensure that a holding circuit is maintained for the relays 1ZA and 2ZA so that those relays and the relays 1XA and 2XA remain operated.

Incoming Tieline Call

A call over the tieline connected to the junction supervisory that has previously been considered is initiated by the line wires 102 being looped at the remote exchange. Relay IS is operated in response to this condition and contacts IS1 closing cause relay ISA also to operate while contacts ISA1 complete a circuit to operate relay IC.

As a result of contacts ISA3 and IC4 closing, a pulse is supplied over the lead 95 to the coder 22 to bring a free register into use as previously described. This in turn brings the common control apparatus 17 into use and that apparatus provides an earth connection to a lead 110 so that relay E is then operated. A lead 111 is thus earthed, by way of contacts IC1, YA2 and E2, and this causes the appropriate route indicator lamp 112 on each switchboard 11 to be lit. At the same time relay 2IA is operated.

One of the operators subsequently answers by operating the appropriate route answer key ANS and at the same time operates a speak key SK of a free connect circuit 51 to allocate the call to that circuit. On this occasion, operation of the relay 1AS associated with the route of the incoming call under consideration, causes lead 113 to be earthed so as to bring both a route answer allotter 114 and a service supervisory allotted 115 in use. The allotter 115 allocates a free service supervisory to this call by earthing an appropriate lead 106 which causes relay MS (FIG. 10) in the allotter service supervisory to operate. This in turn results in the appropriate X- and Z-switches being operated to connect this supervisory to the switchboard 11 as previously described.

The allotter 114 earths the lead 117 connected to the junction supervisory 7 having its contacts 2IA1 operated. This earth potential is extended through the contacts 2IA1 to the lead 92 and, as previously, this results in the appropriate Y-switch being operated to connect the junction supervisory 7 through to the allocated service supervisory 8. Relay YA in the junction supervisory 7 is operated at this time and contacts YA2 interrupt the circuit of the lamp 112 which is thus extinguished although the "waiting" lamp 55 is then lit.

A free register 25 is automatically taken into use as previously, and the operator then speaks to the calling party and, on learning the number of the wanted extension party, proceeds to key the wanted number, signals representing this number being passed to the register in question. The subsequent action to set up the required call is similar to that previously described in connection with an operator-assisted extension-to-extension call and, if the operator does not wish to supervise the call when it is set up, a direct connection is automatically effected through the switching stages 1, 2 and 3 between the junction supervisory 7 and the line unit 5 of the called-extension party.

Although not fully dealt with herein, the exchange under consideration may be adapted to extend a call received over a tieline of one line route to a tieline of another route. In this case the incoming tieline of first connected through to an operator by way of a service supervisory 8 in the manner already described. Upon the operator keying the digit code appropriate to the outgoing route, a connection is set up through the switching stages 1, 2 and 3 from the service supervisory 8 over the leads marked "To A switches" in FIG. 10 (see also leads represented by the line 16 in FIG. 1), to a junction supervisory 7 that is connected to a tieline of the required route.

"Enquiry" call

The exchange under consideration has provision for an extension party which is connected through the exchange to a distant exchange, the extension party being either the calling party of the called party, to make an "enquiry" call to another extension party without breaking down the original call and subsequently to return to the original call. When such an "enquiry" call is to be made, the extension party presses an "enquiry" button on his telephone instrument and this earths both his line wires 4 (FIG. 2). This condition is passed through the operated A-, B- and C-switches and relay EA in the junction supervisory associated with the call to be operated, the two windings of this relay being wound in opposition so that relay is not operated under normal conditions. Contacts EA1 closing cause relay EB to operate.

Contacts EB1 break the connection between leads 116 and 117 to signify to the service supervisory allotter 115 that a free service supervisory is required. This allotter subsequently earths the lead 106 connected to a free service supervisory so as to operate the relay MS in that supervisory. Contacts MS2 cause relay OMS to operate. The allotter 115 also applies earth potential to the lead 115 at this time and this results in a Y-switch being operated in the manner previously described.

The earth potential applied to the lead 105 over contacts EB2 in the junction supervisory 7 is thus extended through the operated Y-switch and causes relay EQA in the allotted service supervisory to operate. Contacts EQA1 closing cause relay AR to operate while contacts EQA2 provide a holding circuit for the operated Y-switch. Subsequent to relay AR operating, relay PG is operated and a pulse is supplied to the coder 22 over the lead 81 as previously described.

When the said telephone pushbutton is released, relays EA and EB in the junction supervisory 7 restore so that negative potential is applied over a lead 118 to operate relay 1EQ in the service supervisory 8. Relay 2EQ is operated over contacts 1EA1. Closure of contacts 2EQ1 and 2EQ2 cause relays 1SE, 1SJ and 3SJ to be operated. Contacts 2EQ3 and 2EQ4 extend the speech path from the extension party by way of the junction supervisory, the operated Y-switch, operated contacts 1SE1 and 1SE2 to the register access switch 33 and through that switch to the register that was brought into use upon a pulse being passed to the coder 22 over lead 81.

The extension party then dials the number of the extension party to which he requires connection. A connection is subsequently set up by way of the transmission bridge 65, substantially in the manner previously described, between the wanted extension party and the service supervisory leads that are marked "To C switches (2)" so that a complete speech path is then established between the two extension parties.

When the extension call is to be broken down, the first extension party again presses his "enquiry" button. On this occasion the line condition is detected by both relay EA (in the junction supervisory 7) and by relay 1E in the service supervisory 8 (FIG. 10). (Relay 1E is similar to relay EA and, unlike relay 1D, is not operated in response to a normal line loop.) Contacts 1E1 complete a circuit to operate relay 2E and contacts 2E1 changeover to prevent reoperation of relay EQA while contacts 2E2 cause relay 1EQ to release. This in turn releases relay 2EQ and contacts 2EQ5 break the hold circuit for the operated Y-switch. The Y-switch thus restores to return the call to its original state.

Although not fully dealt with herein, the exchange under consideration may be adapted to transfer a call from one extension party to another. To effect such a transfer, the first extension party makes an "enquiry" call, as just described, to the second extension party and then hangs up whereupon the service supervisory 8 effects the necessary switching (and remains in circuit for the duration of the call) between the junction supervisory of the tieline in question and the "To C switches (2)" leads of the service supervisory 8. This procedure of making inquiry calls and subsequently (if required) effecting transfer may be repeated as often as desired using alternately the "To C switch (1)" leads and the "To C switch (2)" leads.

Operator Recall

An extension party involved in a call may make an "enquiry" call to an operator. If the original call does not involve a service supervisory 7, a free service supervisory is brought into use (as previously described in connection with inquiry calls) and, upon the extension party dialling the digit "0" (to call an operator), the register 25 that has been taken into use responds to this digit and supplies a signal to operate a relay 1OR in the service supervisory. Closure of contacts 1OR1 complete the circuit to operate a relay OR (which is common to the whole exchange) and changeover contacts OR1 connect the calling lamp 56 to an intermittent earth (represented by the "box"115) so that the lamp 56 flashes. The operator answers as before.

In the event of a call being held by an operator (so that a service supervisory 8 is already connected through to a switchboard 11) when an extension party to that call initiates an inquiry call to an operator, the operation of relay 1OR results in the lead 75 being connected by way of contacts 1HD2, 1OR1 and 1HD4 to an intermittent earth 116 so as to cause the "waiting" lamp 53 to flash and thereby attract the operator's attention.

The exchange described above may be modified by replacing all the route answer keys ANS of each switchboard 11 by a common answering key. In this case the tieline calling lamps 112 are omitted and common calling is effected using the lamp 56. A further allotter is provided to effect connections to the appropriate route when the common answering key is operated.

I claim:

1. A private telephone exchange comprising a switching network for setting up a call through the exchange on an automatic basis without the intervention of an operator; a plurality of auxiliary circuit units; circuit means connecting said auxiliary units to said switching network to enable a speech path to be set up through the switching network to any one of the auxiliary units; an operator's switchboard having a speech circuit, a plurality of manually operable switch means, indicator means and manually operable answering switch means: circuit means to connect all said auxiliary units to said indicator means to operate the indicator means when a call requiring the operator's attention is extended through said switching network to any one of the auxiliary units; a plurality of interconnecting switch means connected between said auxiliary circuit units on one side and the speech circuit of said operator's switchboard on the other side; circuit means connected to said manually operable answering switch means and to said plurality of manually operable switch means, to control the operation of said interconnecting switch means so that by operating both the manually operable answering switch means and one of the plurality of manually operable switch means when an indication of a call awaiting the operator's attention is given by the indicator means the operator may allocate that call to the one of the plurality of manually operable switch means that is then operated; and switch operating means connected in circuit with said manually operable switch means for controlling said interconnecting switch means so that when a call has been allocated to one of the manually operable switch means the speech path of that call may be extended from the appropriate auxiliary unit to the operator's speech circuit by the operator operating that manually operable switch means.

2. A private telephone exchange according to claim 1 wherein the operator's switchboard has indicator means individually associated with each of said plurality of manually operable switch means to signify when a call is allocated on the switchboard to that switch means.

3. A private telephone exchange comprising a switching network for setting up a call through the exchange on an automatic basis without the intervention of an operator; a plurality of auxiliary circuit units each having first and second sets of speech leads, a speech transmission bridge, and circuit means to connect said transmission bridge between said first and second sets of speech leads; circuit means to connect the first sets of speech leads of the auxiliary circuit units to said switching network to enable a speech path to be set up through the switching network to any one of the auxiliary units; an operator's switchboard having a speech circuit, a plurality of manually operable switch means, and operator-controlled signalling means for signalling the identity of an extension party connected to the exchange; a plurality of interconnecting switch means connected between the auxiliary circuit units on one side and said operator's switchboard on the other side so that, by operation of one of these switch means, the speech path set up through the switching network to an auxiliary circuit unit as aforesaid may be extended through operated interconnecting switch means to the operator's speech circuit and a circuit may be established through the operated switch means between the operator's signalling means and the appropriate auxiliary circuit unit to enable the operator to signal to the switching network by way of the auxiliary circuit unit information as to the identity of an extension party to which connection is required; switch operating means connected in circuit with said manually operable switch means for controlling said interconnecting switch means so that auxiliary circuit units to which speech paths are set up at any time through the switching network may selectively have those speech paths extended to the operator's speech circuit by the operator operating the appropriate manually operable switch means; further circuit means connecting the second set of speech leads of each auxiliary circuit unit to said switching network to extend to such an auxiliary unit a speech path set up through the switching network to an extension party connected to the exchange; and means to cause the switching network to set up a connection therethrough between a called extension party the identity of which is signalled by the operator to the switching network by way of one of the auxiliary circuit units as aforesaid and the second set of speech leads of that auxiliary circuit unit.

4. A private telephone exchange comprising a plurality of circuit units (subsequently termed "external units") to which external lines to the exchange are connected, a switching network for setting up calls through the exchange on an automatic basis between extension parties connected to the exchange and said external units, a plurality of auxiliary circuit units that are utilized at least for operator-assisted calls, circuit means connecting said auxiliary units to said switching network to enable a speech path to be set up through the switching network to any one of the auxiliary units, an operator's switchboard which has an operator's speech circuit, call awaiting indication means, manually operable answering switch means and a plurality of call circuits each having manual control switches and indicators to enable an operator to supervise one call, circuit means connecting said external units and said call awaiting indicator means to operate that indicator means when one of said external units has a call awaiting the operator's attention, an allotter to allot a free auxiliary unit to a call awaiting the operator's attention upon operation by the operator of the manually operable answering switch means, a plurality of first interconnecting switch means connected between said external units and said auxiliary units, first switch operating means to operate the appropriate first interconnecting switch means to extend the speech path from a calling external unit to the auxiliary unit allocated by the allotter, a plurality of second interconnecting switch means connected between said auxiliary units and the speech circuit of the operator's switchboard, and second switch operating means connected in circuit with the manual control switches of the operator's switchboard to operate the appropriate second interconnecting switching means under the control of the operator to enable the operator's speech circuit to be connected to the allotted auxiliary unit and, through that unit and the operated first interconnecting switch means, to the appropriate external unit.

5. A private telephone exchange according to claim 4 wherein said operator's switchboard has operator-controlled signalling means for signalling the identity of an extension party connected to the exchange, each of said auxiliary units has first and second sets of speech leads of which the first set is connected to switch means of the plurality of first interconnecting switch means, a speech transmission bridge, and means to connect said transmission bridge between said first and second sets of speech leads, and there are also provided further circuit means to connect the second set of speech leads of each auxiliary unit to the switching network to extend to the auxiliary unit a speech path set up through that network, a circuit which is set up when the speech path of an auxiliary unit is extended to the operator's speech circuit as aforesaid from said operator-controlled signalling means by way of said second interconnecting switch means and that auxiliary unit to the switching network so that the operator may signal to the switching network information as to the identity of an extension party to which connection is required, and means to cause the switching network to set up a connection therethrough between the called extension party and the second set of speech leads of the auxiliary unit.

6. A private telephone exchange according to claim 5 wherein there are provided means operable upon the operator extending a call from an external unit to an extension party to cause a direct connection to be set up through the switching network between the extension unit and that extension party, and release means subsequently operable to release both the operator's switchboard from that call and the auxiliary unit used for setting up the call.

7. A private telephone exchange according to claim 6 wherein each call circuit of the operator's switchboard has manually operable switch means and there is circuit means connected in circuit with the last-mentioned switch means to inhibit operation of said release means so that by operation of this switch means of a call circuit the operator may continue to supervise a call that has been handled by way of that call circuit.

* * * * *